US011919451B2

(12) United States Patent
Kobashi et al.

(10) Patent No.: US 11,919,451 B2
(45) Date of Patent: Mar. 5, 2024

(54) VEHICLE DATA DISPLAY SYSTEM (71) Applicant: NISSAN NORTH AMERICA, INC., Franklin, TN (US)

(72) Inventors: Atsuhide Kobashi, Santa Clara, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 83 days.

(21) Appl. No.: 17/683,141

(22) Filed: Feb. 28, 2022

(65) Prior Publication Data
US 2023/0271556 A1   Aug. 31, 2023

(51) Int. Cl.
*B60R 1/27*  (2022.01)
*B60K 35/00* (2006.01)
*B60R 1/30*  (2022.01)
*B60W 50/14* (2020.01)
*G06T 17/00* (2006.01)
*G06T 17/05* (2011.01)

(52) U.S. Cl.
CPC ............... *B60R 1/27* (2022.01); *B60K 35/00* (2013.01); *B60R 1/30* (2022.01); *B60W 50/14* (2013.01); *G06T 17/00* (2013.01); *G06T 17/05* (2013.01); *B60R 2300/301* (2013.01); *B60R 2300/8093* (2013.01); *B60W 2050/146* (2013.01); *B60W 2420/42* (2013.01)

(58) Field of Classification Search
CPC ....... B60R 1/27; B60R 1/30; B60R 2300/301; B60R 2300/8093; B60K 35/00; B60W 50/14; B60W 2050/146; G06T 17/00; G06T 17/05
See application file for complete search history.

(56) References Cited

U.S. PATENT DOCUMENTS

| 10,377,310 | B2 | 8/2019 | Tan et al. |
| 10,493,952 | B1 | 12/2019 | Schwie et al. |
| 10,576,972 | B2 | 3/2020 | Gokan et al. |
| 10,611,374 | B2 | 4/2020 | Sato et al. |
| 10,683,008 | B2 | 6/2020 | Pawlicki et al. |
| 10,699,457 | B2 | 6/2020 | Mohan et al. |
| 10,852,418 | B2 | 12/2020 | Wodrich et al. |

(Continued)

*Primary Examiner* — Terrell M Robinson
(74) *Attorney, Agent, or Firm* — Global IP Counselors, LLP (57) ABSTRACT

A vehicle data display system includes an electronic display installed within a vehicle, a 3-D sensor and an electronic controller. The 3-D sensor configured to scan areas forward of and along lateral sides of the vehicle producing point cloud. Each data point of the cloud data corresponding to a surface portion of a physical feature. Each data point includes distance, direction and vertical location of each surface point. The electronic controller is connected to the electronic display and the 3-D sensor. The electronic controller receives and evaluates the point cloud from the 3-D sensor generating a 3-D model of detected ones of the physical features around the vehicle including ground surfaces, non-drivable features and driving limiting features relative to the vehicle. The non-drivable features are features that have predetermined geometric relationships with adjacent ground surfaces such that caution is to be taken when driving over or on driving limiting features.

18 Claims, 10 Drawing Sheets

(56) References Cited

U.S. PATENT DOCUMENTS

| | | |
|---|---|---|
| 10,988,120 B2 | 4/2021 | Gomes |
| 10,988,139 B2 | 4/2021 | Fukushige et al. |
| 11,030,818 B1 | 6/2021 | Wang et al. |
| 11,052,925 B2 | 7/2021 | Gotou et al. |
| 11,221,622 B2 | 1/2022 | Schwie et al. |
| 2007/0103282 A1* | 5/2007 | Caird ................ G08G 1/165 340/686.6 |
| 2010/0121577 A1* | 5/2010 | Zhang ............... G06F 18/256 382/104 |
| 2016/0159283 A1* | 6/2016 | Lynam .............. H04N 23/698 348/148 |
| 2016/0163108 A1* | 6/2016 | Kim ................. G02B 27/0101 345/633 |
| 2018/0300620 A1* | 10/2018 | Gerardo Castro ... G05D 1/0088 |
| 2019/0086546 A1* | 3/2019 | Tsishkou ............ G06V 10/764 |
| 2019/0287282 A1* | 9/2019 | Mohan ................ B60R 1/12 |

\* cited by examiner

VEHICLE DATA DISPLAY SYSTEM

TECHNICAL FIELD

The present disclosure generally relates to a vehicle data display system. More specifically, the present disclosure relates to a vehicle data display system that displays data points from a processed point cloud showing a drivable area and surface points corresponding to surface portions of non-drivable obstacles and driving limiting features.

BACKGROUND INFORMATION

Detecting physical features like curbs, speed bumps, potholes, and other physical obstructions in the areas around a vehicle is both a taxing and critical task for a driver. It is complicated by environmental conditions, such as darkness at night, inclement weather conditions and driver limitations, such as poor eyesight and/or obstructions such as an A-pillar, a B-pillar and other portions of a vehicle body structure. Detection of such features is not possible by radar. Detection of such features is not consistently possible by cameras because images from a camera do not include information regarding distance of objects from the vehicle. Further, interpreting and translating camera images into a 3D scene understanding of what is around a vehicle is only possible if the surfaces of captured images have non-repeating features that are detectable by computer vision and/or object identification techniques. Also interpreting such camera data using object identification techniques is dependent upon local objects. For example, objects often found in or along a roadway in the U.S.A. can be much different from those objects found in or along the roads outside of the U.S.A. Further, such camera-based systems are of little effect when the vehicle is being operated at night and/or in heavy rain, snow or foggy weather conditions.

SUMMARY

One object of the present disclosure is to provide a vehicle with a vehicle data display system configured to show a representation of surface features forward of and/or adjacent to a drivable area of the vehicle in real time regardless lighting and most environmental conditions.

In view of the state of the known technology, one aspect of the present disclosure is to provide a vehicle data display system with a vehicle having a vehicle body structure, an electronic display, a 3-D sensor, and an electronic controller. The electronic display is installed within the vehicle body structure. The 3-D sensor is also installed to the vehicle body structure. The 3-D sensor is configured to scan areas forward of and along lateral sides of the vehicle producing cloud data. Each data point of the cloud data corresponds to a surface point of a physical feature and includes distance, direction and vertical location of each scanned surface point of the physical feature relative to the vehicle. The electronic controller is connected to the electronic display and the 3-D sensor. The electronic controller receives and evaluates the cloud data from the 3-D sensor generating a 3-D model of detected ones of the physical features around the vehicle including ground surfaces, non-drivable features and driving limiting features relative to the vehicle. The non-drivable features are features that have predetermined geometric relationships with adjacent portions of the ground surfaces. The driving limiting features are features vertically dimensioned such that caution is to be taken when driving over or on the driving limiting features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
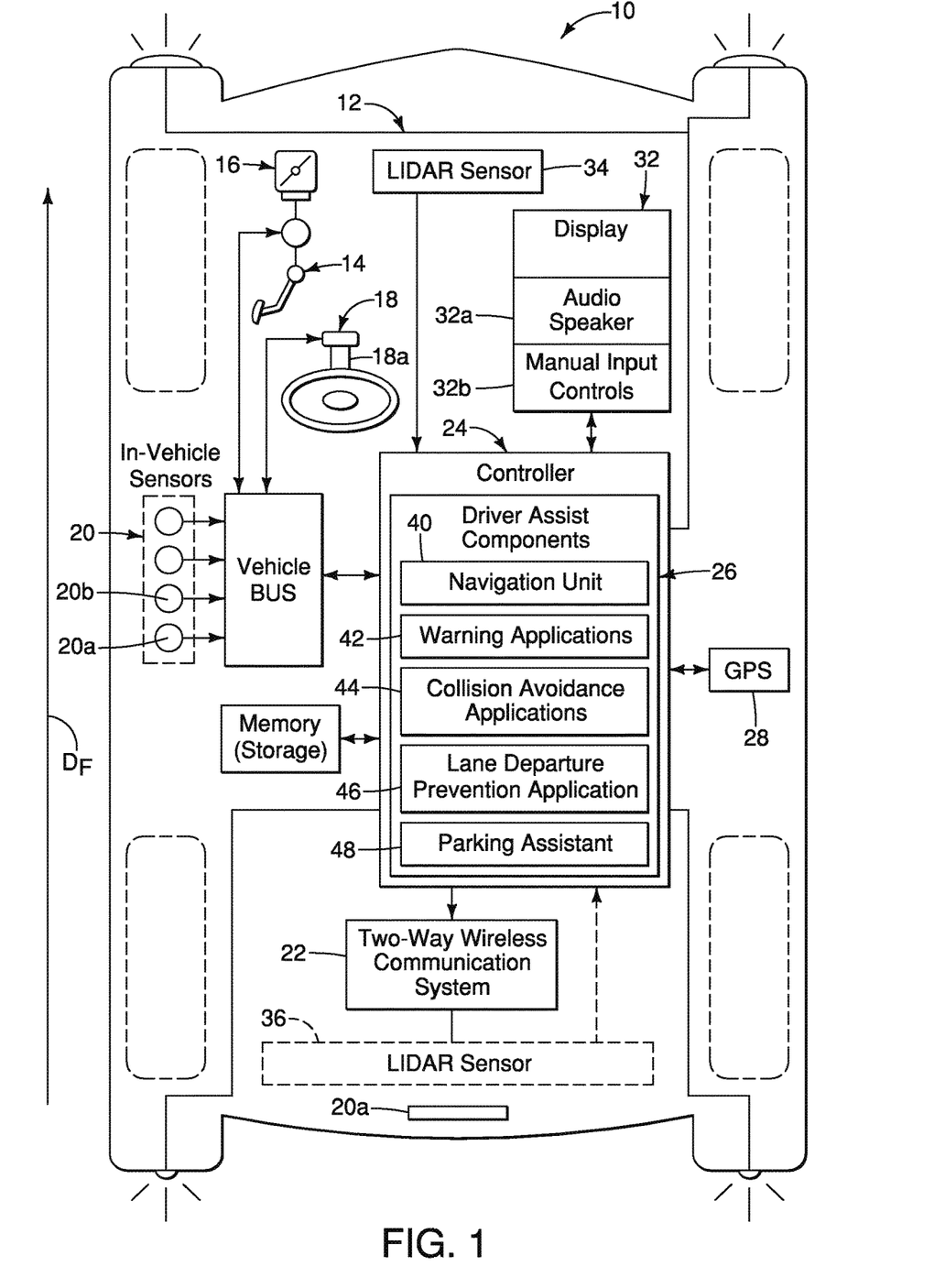
FIG. 1 is a schematic top view of a vehicle that includes an electronic controller and at least one 3D sensor connected to the electronic controller, the electronic controller being connected to or including a plurality of driver assist applications in accordance with a first embodiment.

Referring initially to FIG. 1, a vehicle 10 is illustrated in accordance with a first embodiment. The vehicle 10 can be any of a variety of vehicle designs, including a sedan, a coupe, an SUV (sports utility vehicle), a van, a pickup truck or a commercial vehicle. The vehicle 10 includes, among other features and components, a passenger compartment (not shown), a vehicle data display system 12, a braking system 14, an accelerator 16 connected to an engine (not shown) and a steering system 18. The vehicle 10 further includes a plurality of sensors 20, an optional two-way wireless communication system 22, an electronic controller 24, a plurality of driver assist components 26, a GPS 28, a display 32, a first 3D sensor 34 (a LIDAR, device) and an optional second 3D sensor 36 (a second LIDAR device).

The vehicle data display system 12 is described further herein below. The braking system 14, the accelerator 16 and the steering system 18 are all conventional vehicle components that are manually operated by a vehicle operator (not shown). Each of the braking system 14, the accelerator 16 and the steering system 18 are also configured to by electronically operated by one or more of the driver assist components 26 via the electronic controller 24, as is described further herein below.

The plurality of sensors 20 can include at least sonar/radar sensors 20a installed to forward and/or rearward areas of the vehicle 10, in a conventional manner. The plurality of sensors 20 can further include a speed sensor 20b connected to the engine (not shown) and/or the transmission (not shown) or the wheels of the vehicle 10 for sensing current speed of the vehicle 10. Each of the plurality of sensors 20 is further connected to the electronic controller 24 such that measurements and detected conditions from the plurality of the sensors 20 can be evaluated by the electronic controller 24 as needed or desired.

The optional two-way wireless communication system 22 is configured for communications with other vehicles, interact communications, communication with traffic control towers and/or satellite communications in a conventional manner.

The GPS 28 is a conventional feature installed to the vehicle 10 in a conventional manner.

The display 32 can be part of other systems in the vehicle 10 in addition to being part of the vehicle data display system 12 connected to the electronic controller 24. The display 32 can be installed within or to the center console as part of an IVI (In-Vehicle infotainment and entertainment) system that provides entertainment, news, traffic and GPS information to passengers within the vehicle 10. The display 32 can also be an electronic display installed to the instrument panel (not shown) in the dashboard (not shown) of the vehicle 10 for sole use by a vehicle operator. Alternatively, the display 32 can be a heads-up-display with a projector that projects images on the glass windscreen (not shown) above a steering column 18a of the steering system 18. The display 32 can be connected to an audio speaker or speakers 32a and manual input controls 32b in a conventional manner via the electronic controller 24.

The first 3D sensor 34 is, for example, a LIDAR device that includes one or a plurality of lasers that emit light and measures the time for reflected light to return. LIDAR devices are configured such that there are between 10-25 scans per second and a corresponding number of point clouds of data points representing returned reflections, each reflection defining a data point. However, LIDAR devices with greater numbers of scans per second (100 Hz-400 Hz) are available and can be employed herein. A plurality of data points collected by the LIDAR device form a point cloud. Each point in the point cloud corresponds a small surface portion of an object that has been scanned. Each data point includes distance, direction and height of the small surface portion of the object relative to the LIDAR device. Since the first 3D sensor 34 is mounted to the vehicle 10, all data points of the point cloud collected by the first 3D sensor 34 are measurements made relative to the vehicle 10. The first 3D sensor 34 can alternatively be a plurality of first 3D sensors installed, for example, at spaced apart locations along the front bumper assembly of the vehicle 10. For example, there can be six 3D sensors installed to the front bumper. Still further, the first 3D sensor 34 can be a FMCW (frequency modulated continuous wave) LIDAR device that, instead of sending out a pulse of light, outputs a continuous laser beam (not a pulse) with a continuously changing optical frequency. By comparing and processing the optical frequency of the reflected beam with the frequency when it was sent out, the electronic controller 24 can determine the distance as well as a Doppler velocity for that particular data point.

Figure 18:
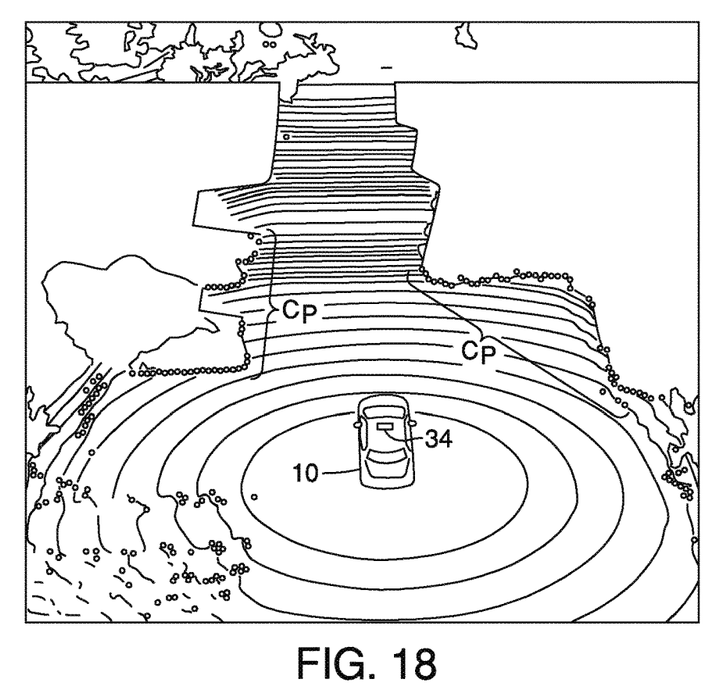
FIG. 18 is another three-dimensional perspective view of the digital data points of the point cloud after evaluation by the electronic controller showing drivable areas and data points representing curbs, objects and obstacles that represent non-drivable areas forward and along lateral sides of the vehicle as displayed on the electronic display in accordance with the first embodiment.

The first 3D sensor 34 (a LIDAR device) is further configured to scan areas forward and along lateral sides of the vehicle 10. Specifically, the laser(s) and optical detectors within the LIDAR device scan relative, for example, a vertical axis and scanning side-to-side with a scanning sweep of approximately 180 degrees or close to 180 degrees, as shown in FIG. 18. Further, during the movement of the laser(s) and optical detectors within the LIDAR device multiple data points are collected with each degree of the 180 degree scan. However, it should be understood that it is possible to achieve 360 degree scan, if necessary, depending upon the type of vehicle. Further, with the vehicle 10 in motion, many point clouds are collected are collected each second of operation of the first 3D sensor 34. The data points collected by the first 3D sensor 34 therefore can assembly a plurality of point cloud per second.

The first 3D sensor 34 is preferably installed to the vehicle at a high location of the vehicle 10, such as the roof of the vehicle 10, or just forward of the rearview mirror (not shown) at the top of the windshield or windscreen (not shown) of the vehicle 10. If an optional second 3D sensor 36 is employed, it is preferably installed to a rearward location of the vehicle 10, such as the rear of the roof (not shown) of the vehicle 10 or other elevated area of a rearward portion of the vehicle 10. The optional second 3D sensor 36 is also a LIDAR device, as described above.

The vehicle data display system 12 of the present invention includes at least the first 3D sensor 34 (a LIDAR device), the electronic controller 24 and at least one of the plurality driver assist components 26.

The electronic controller 24 preferably includes a microcomputer with a point cloud processing and data display system control program that processes point cloud data from LIDAR devices controls the plurality driver assist components 26, as discussed below. The electronic controller 24 can also include other conventional components such as an input interface circuit, an output interface circuit, and storage devices (memory) such as a ROM (Read Only Memory) device and a RAM (Random Access Memory) device. The microcomputer of the electronic controller 24 is programmed to control the first 3D sensor 34 and process point cloud data received therefrom. The memory circuit stores processing results and control programs such as ones for driver assist component operation that are run by the processor circuit. The electronic controller 24 is operatively coupled to the driver assist components 26, the first 3D sensor 34, the braking system 14, the accelerator 16 and the steering system 18 in a conventional manner. The internal RAM of the electronic controller 24 stores statuses of operational flags and various control data. The electronic controller 24 is capable of selectively controlling any of the components of the plurality driver assist components 26 and the data display system 12 in accordance with the control program.

The electronic controller 24 is configured to operate the 3D sensor 34 causing it to scan and capture data using laser imaging up to 100 times per second, detecting height, direction and distance of each reflected data point relative to the vehicle 10. As mentioned above, each of the data points in each point cloud collected by the 3D sensor 34 represents ground surface features including vertical obstacles, non-vertical obstacles and a drivable area or areas proximate the vehicle 10 within a line-of-sight of the 3D sensor 34.

More specifically, the electronic controller 24 (installed within the vehicle 10) is electronically connected to the 3D sensor 34. During operation of the 3D sensor 34, the electronic controller 24 receives the plurality of point clouds from the 3D sensor 34 and thereafter evaluates and processes the received data in a manner depicted in FIG. 2 and demonstrated in FIGS. 3-20 to create images of the data points of the point clouds and further showing in those images drivable areas that are displayed on the display 32, as described further below. The electronic controller 24 conducts the following: a vertical obstacle extraction from the data; terrain estimation from the data; curb detection from the data; and generating a plurality of data elements identifying vertical obstacles including curbs and the drivable area to the at least one driver assist component.

It should be understood that the vehicle 10 is preferably in motion while the first 3D sensor 34 is operating. Therefore, the 3D sensor 34 is continuously collecting data points and assembling point clouds and transmitting each point cloud to the electronic controller 24. The plurality of cloud points are collected for processing in order to define in real time obstacles around the vehicle 10 so that a continuously updated set of data points can be displayed on the display 32 for the vehicle operator. The speed sensor 20b of the vehicle 10 is connected to the electronic controller 24 such that each point cloud received from the 3d sensor 34 to the electronic controller 24 is correlated by speed to distance traveled to the data points displayed on the display 32. Alternatively, the electronic controller 24 can be connected to an odometer (not shown) of the vehicle 10 to correlate point clouds to distance traveled.

The plurality of driver assist components 26 include one or more (or all) of the following: a navigation application 40 (also referred to as a navigation app 40), an obstacle warning application 42 (also referred to as an obstacle warning app 42), a collision avoidance application 44 (also referred to as a collision avoidance app 44), a lane departure application 46 (also referred to as a lane departure app 46) and a parking assistant application 48 (also referred to as a parking assistant app 48).

Figure 2:
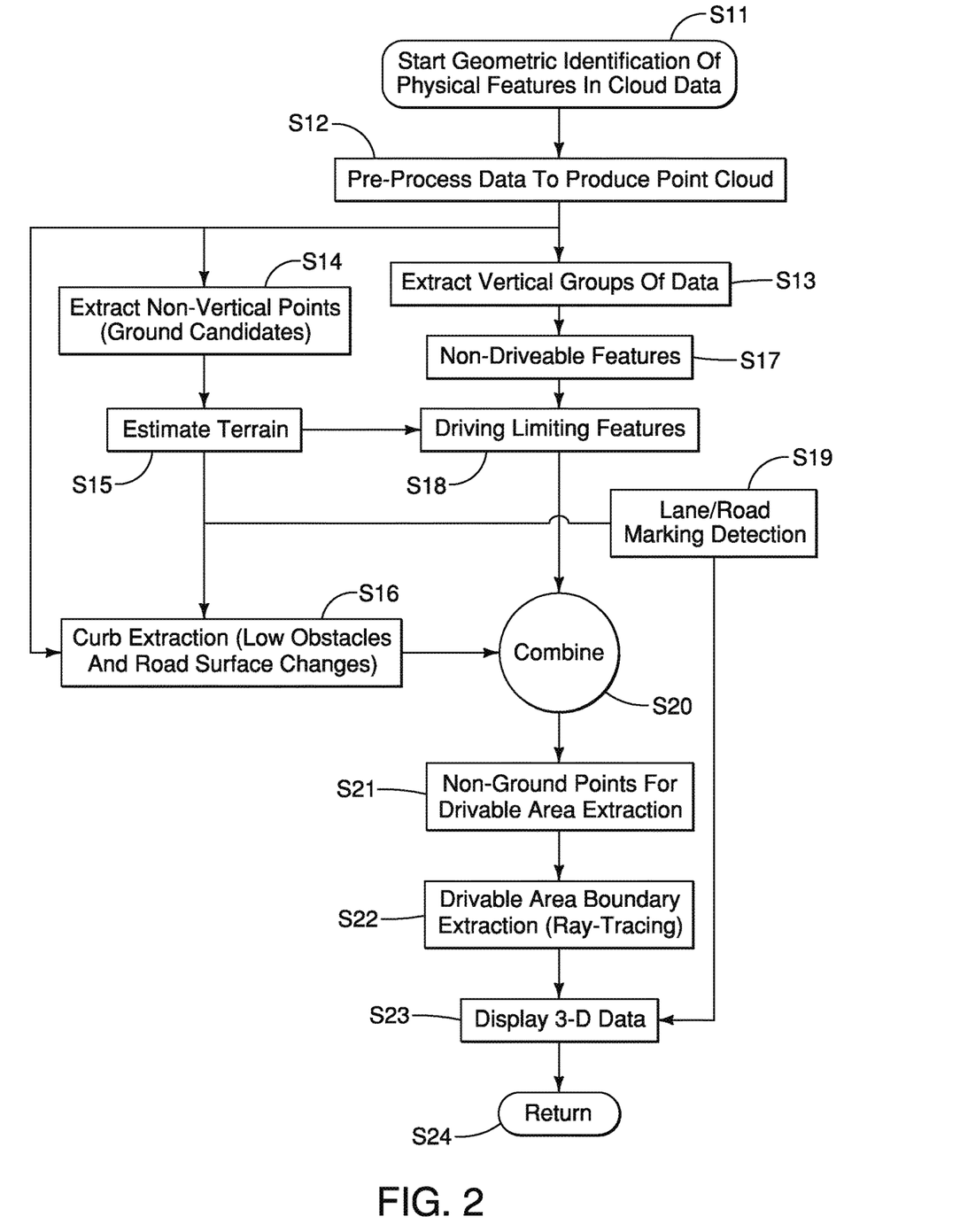
FIG. 2 is a flowchart showing basic steps conducted by the electronic controller in the evaluation and extraction of data points received from the 3D sensor in accordance with the first embodiment.
Figure 3:
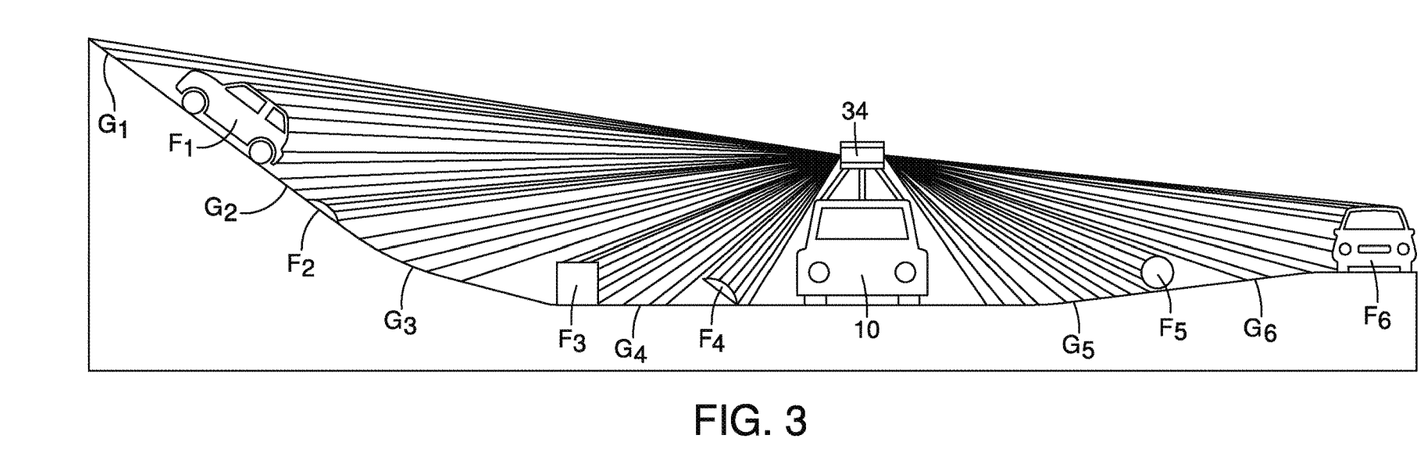
FIG. 3 is a two-dimensional schematic view of the vehicle and the 3D sensor showing various features around the vehicle including objects, obstacles, a curb and ground features showing lines-of-sight from the 3D sensor to surface portions of many the objects, obstacles, a curb and ground features during a scan by the 3D sensor in accordance with the first embodiment.
Figure 4:
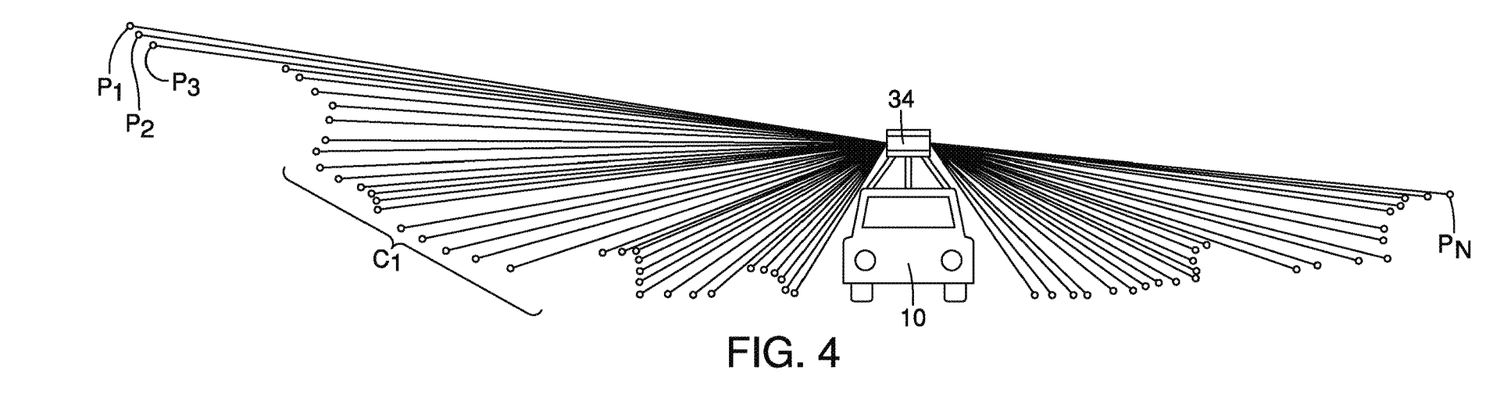
FIG. 4 is another two-dimensional schematic view of the vehicle and the 3D sensor showing data points that define a two-dimensional portion of a point cloud where each data point of the point cloud corresponds to light reflections off surface portions of the various features around the vehicle including the objects, obstacles, the curb and some of the ground features in accordance with the first embodiment.
Figure 5:
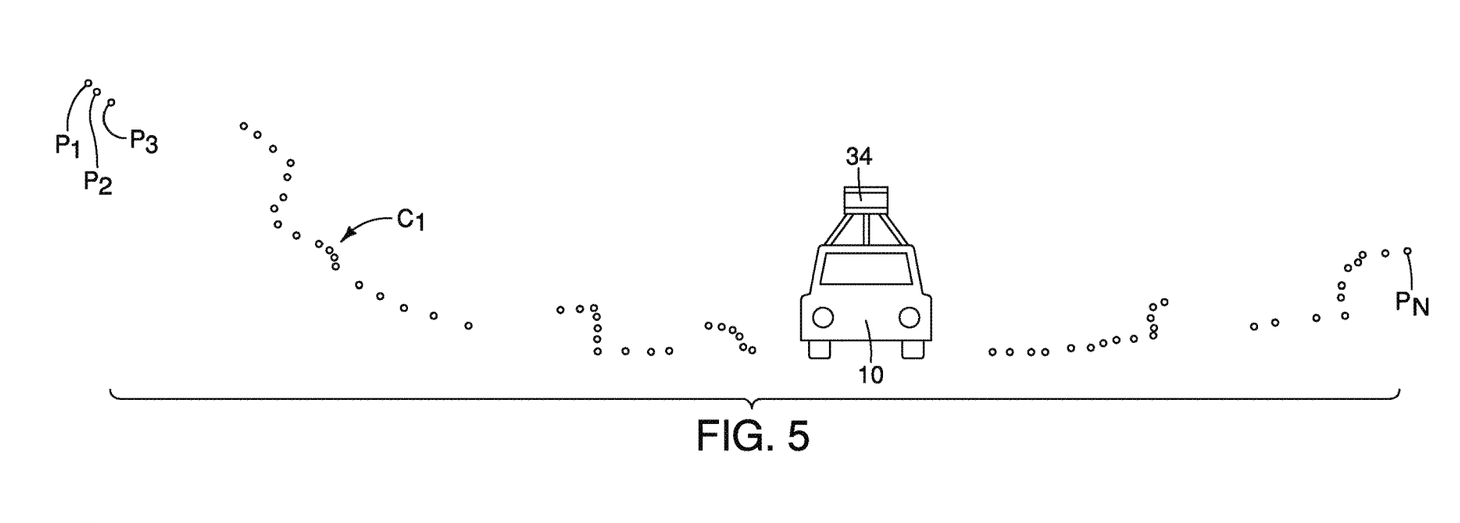
FIG. 5 is another two-dimensional schematic view of the vehicle and the 3D sensor showing the digital data points of the point cloud, each data point corresponding to surface portions of the various features around the vehicle, each digital data point having distance, direction and height information relative to the vehicle of the corresponding surface portion with the first embodiment.

As shown in FIG. 2, when the vehicle 10 is operating, the electronic controller 24 begins operating the first 3D sensor 34 at step S11 such that the first 3D sensor 34 begins collecting data points, assembling point clouds and transmits the point clouds to the electronic controller 24. A two-dimensional depiction of features $F_1$, $F_2$, $F_3$, $F_4$, $F_5$ and $F_6$ and ground portions $G_1$, $G_2$, $G_3$, $G_4$, $G_5$ and $G_6$ around the vehicle 10 is shown in FIG. 3. Lines of sight extending from the first 3D sensor 34 are shown, surface portions of each of the features $F_1$, $F_2$, $F_3$, $F_4$, $F_5$ and $F_6$ and each of the ground portions $G_1$, $G_2$, $G_3$, $G_4$, $G_5$ and $G_6$ is also shown representing the scanning and surface detection process of the first 3D sensor 34. FIG. 4 shows a two-dimensional depiction of an example of a point cloud $C_1$ that includes data points detected by the first 3D sensor 34 of surface portions of features $F_1$, $F_2$, $F_3$, $F_4$, $F_5$ and $F_6$ and ground portions $G_1$, $G_2$, $G_3$, $G_4$, $G_5$ and $G_6$ depicted in FIG. 3. FIG. 4 also shows line-of-sight lines from the data points to the 3D sensor 34. In FIG. 5, the line-of-sight lines from the data points to the 3D sensor 34 are removed leaving only the point cloud $C_1$ and the vehicle 10 with the 3D sensor 34.

Figure 17:
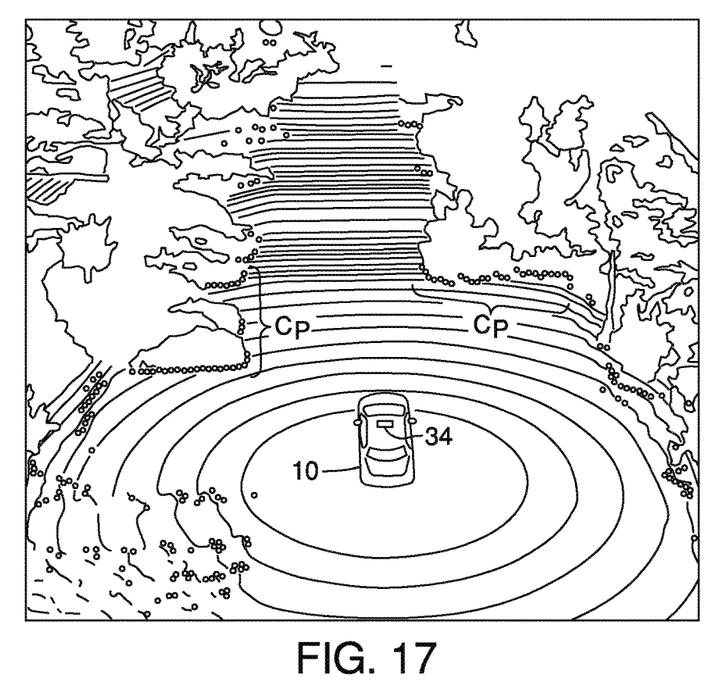
FIG. 17 is a three-dimensional perspective view of the digital data points of the point cloud after evaluation by the electronic controller showing drivable areas and data points representing curbs, objects and obstacles that represent non-drivable areas forward and along lateral sides of the vehicle as displayed on the electronic display in accordance with the first embodiment.

The data points depicted in FIGS. 4 and 5 represent an example of a portion of a first point cloud $C_1$. Specifically, FIG. 3 is a two-dimensional representation of areas on either lateral side of the vehicle 10. Hence, the data points of those features and ground portions forward of the vehicle 10 are not visible in FIGS. 4-5. However, those features and ground portions forward of the vehicle 10 are scanned generating corresponding data points that are generated by the 3D sensor 34, as shown in FIGS. 17 and 18 and discussed further below. Correspondingly, the two-dimensional representation in FIG. 5 is only shows a sub-set of the data points of the point cloud $C_1$. It should be understood from the drawings and description herein that the partial point cloud $C_1$ depicted in FIGS. 4 and 5 includes additional data points (not shown) that corresponding to surface portions of features, objects and ground portions forward of the vehicle 10 that not visible in FIG. 4.

At step S11 in FIG. 2, the electronic controller 24 receives and loads all the data points that make up the most recent of the point clouds $C_1$ detected by the first 3D sensor 34. Each data point $P_1$ thru $P_n$ in FIGS. 4 and 5 is based on a reflection of a portion of the surface of one of the features $F_1$, $F_2$, $F_3$, $F_4$, $F_5$ and $F_6$ or an area of one of the ground portions $G_1$, $G_2$, $G_3$, $G_4$, $G_5$ and $G_6$.

In steps S12-S23 in FIG. 2, the electronic controller 24 evaluates point cloud after point cloud from the 3D sensor 34 and creates a processed point cloud $C_P$ shown in FIGS. 15 and 16, as described in greater detail below. The processed point cloud $C_P$ includes data points representing, for example, vertical obstacles and non-vertical obstacles and a drivable area that can define a roadway and are displayed on the display 22.

The first 3D sensor 34 (a LIDAR device) collects data points that are locations of reflections from surfaces of objects and surfaces adjacent to and forward of the vehicle 10. Each of these data points include direction to the surface (point of reflection), vertical height of the surface and distance to the surface of the point of reflection on the object or obstacle.

At step S12, depending on the type of 3D sensor being employed, the data points $P_1$ thru $P_n$ are pre-processed to properly format the point cloud $C_1$ with the data corresponding to each data point being organized and arranging in the point cloud $C_1$ such that the electronic controller 24 can more advantageously evaluate the data points. Specifically, for each data point $P_1$ thru $P_n$ (FIG. 5) representing a reflection of surface portions of features $F_1$, $F_2$, $F_3$, $F_4$, $F_5$ and $F_6$ and ground portions $G_1$, $G_2$, $G_3$, $G_4$, $G_5$ and $G_6$ as shown in FIGS. 3 and 4 is converted into the point cloud $C_1$ that is partially shown in FIG. 5. Each data point $P_1$ thru $P_n$ has distance, direction and vertical height and is properly arranged for evaluation and processing by the electronic controller 24.

Figure 6:
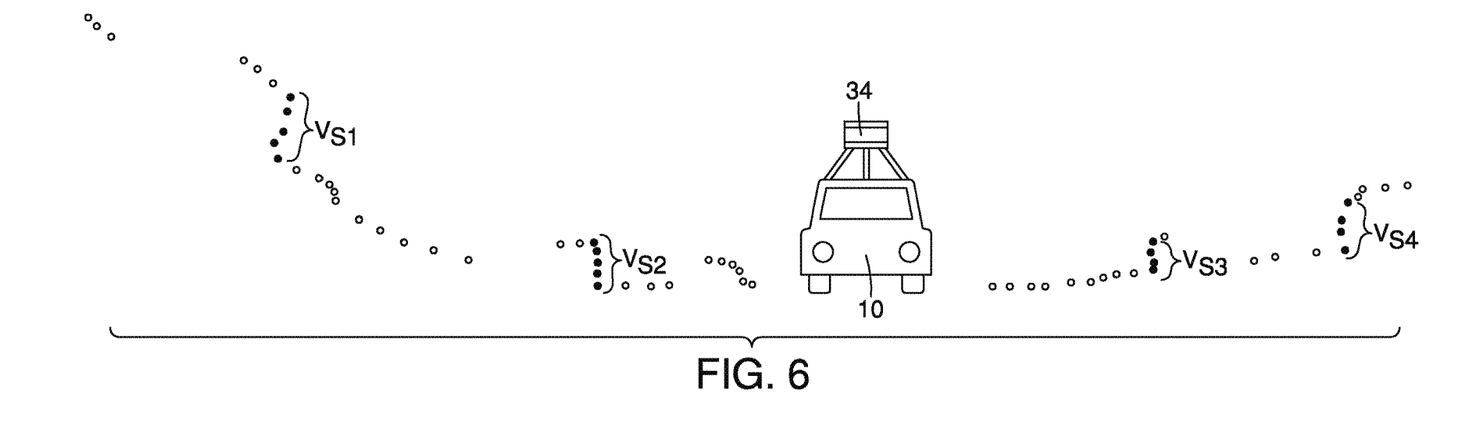
FIG. 6 is still another two-dimensional schematic view of the vehicle and the 3D sensor showing the data points during a first evaluation by the electronic controller where vertical groups of data points are identified, the vertical groups of data points possibly being objects, vehicles, or obstacles around the vehicle in accordance with the first embodiment.

Next the point cloud $C_1$ shown in FIG. 5 is evaluated using concurrent processing paths. A first processing path shown in FIG. 2 at step S13 evaluates the data points in the point cloud $C_1$ and identifies and extracts data points that represent vertical obstacles where groups of data points are stacked one on top of another. Several sub-sets of data points that are arranged in an upright or vertical manner are recognized as defining upright or vertical subsets $V_{S1}$, $V_{S2}$, $V_{S3}$ and $V_{S4}$, as shown in FIG. 6. Evaluating the data point $P_1$ thru $P_n$ in this step is based on a vertical geometric analysis in that obviously vertical sets of points are identified. The upright or vertical subsets $V_{S1}$, $V_{S2}$, $V_{S3}$ and $V_{S4}$ are assumed to be non-drivable areas, objects or obstacles that pose a danger for the vehicle 10, if driven over, or driven near these objects or obstacles. For example, the upright or vertical subsets $V_{S1}$, $V_{S2}$, $V_{S3}$ and $V_{S4}$ are assumed to be the sides of cars, sides of buildings, sides of barriers, side of a box on the road, etc. Thus, the upright or vertical subsets $V_{S1}$, $V_{S2}$, $V_{S3}$ and $V_{S4}$ of data points are designated as non-drivable features and are temporarily removed from the point cloud as shown in FIG. 7 and saved for subsequent use, as described below.

At step S14, non-vertical data points are extracted and designated as possible ground features, ground candidates and/or a drivable area $D_A$ (described further below). The extraction of non-vertical data points of step S14 can be a separate step from step S13. Alternatively, the extraction of non-vertical data points can be a result of the removal of upright or vertical subsets $V_{S1}$, $V_{S2}$, $V_{S3}$ and $V_{S4}$ identified in Step S13 from the point cloud $C_1$. Either way, the remaining data points after step S14 define terrain subsets $T_{S1}$ and $T_{S2}$ of data points shown in FIG. 7 (a group of data points that represent non-vertical data points from the point cloud $C_1$).

Figure 7:
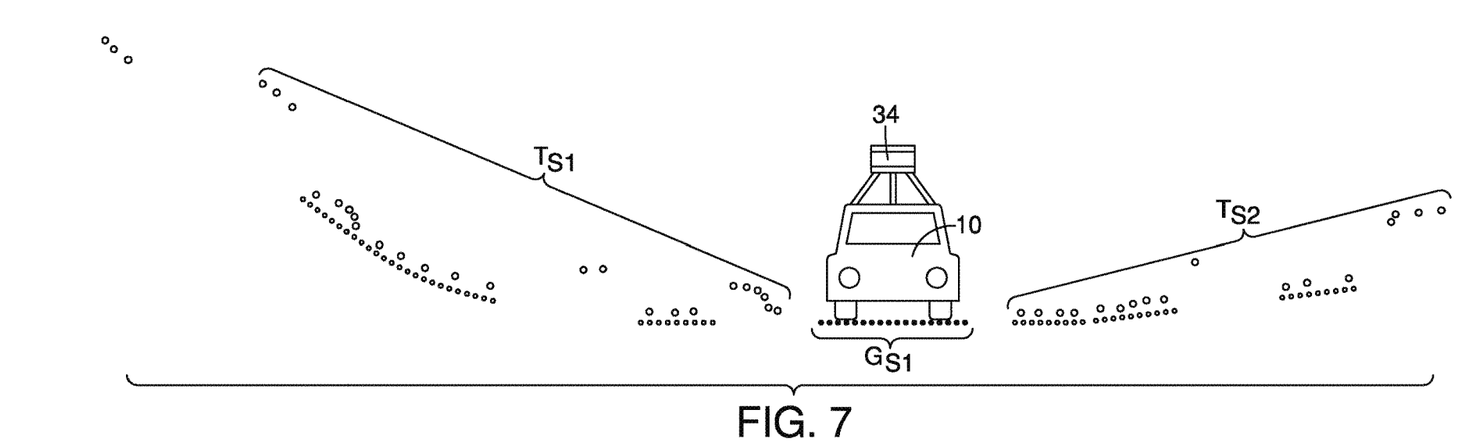
FIG. 7 is yet another two-dimensional schematic view of the vehicle and the 3D sensor showing the data points of the point cloud after the first evaluation by the electronic controller where identified vertical groups of data points are temporarily removed from the point cloud with the electronic controller beginning to conduct a second evaluation of data focusing on ground points in the point cloud in accordance with the first embodiment.
Figure 8:
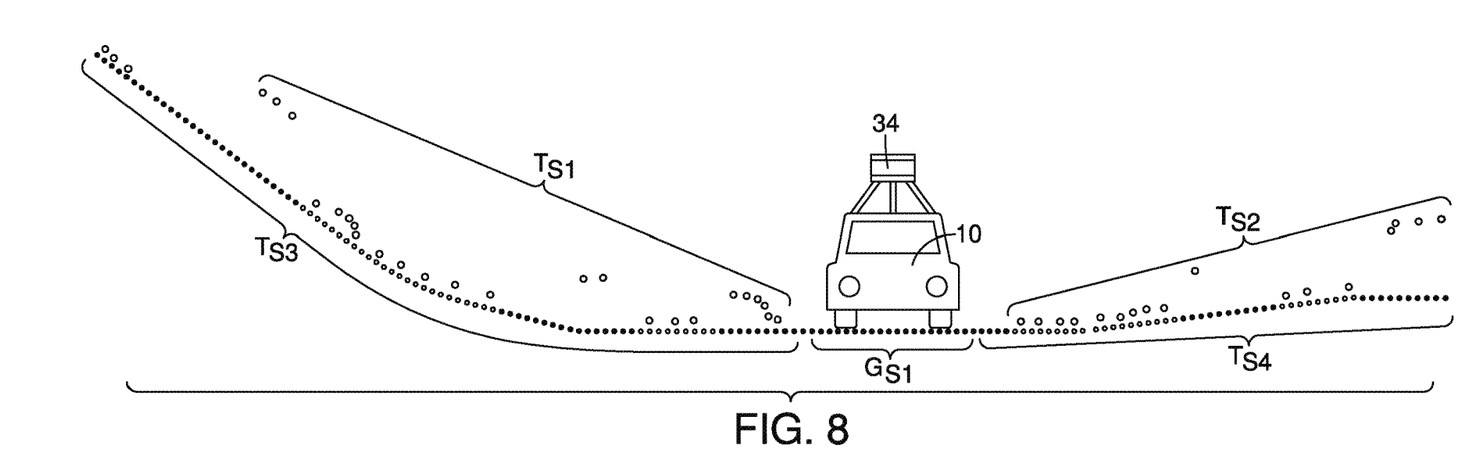
FIG. 8 is another two-dimensional schematic view of the vehicle and the 3D sensor showing the data points of the point cloud after the second evaluation by the electronic controller showing an estimation of the ground surface or terrain around the vehicle with remaining groups of data points of the point cloud in accordance with the first embodiment.
Figure 9:
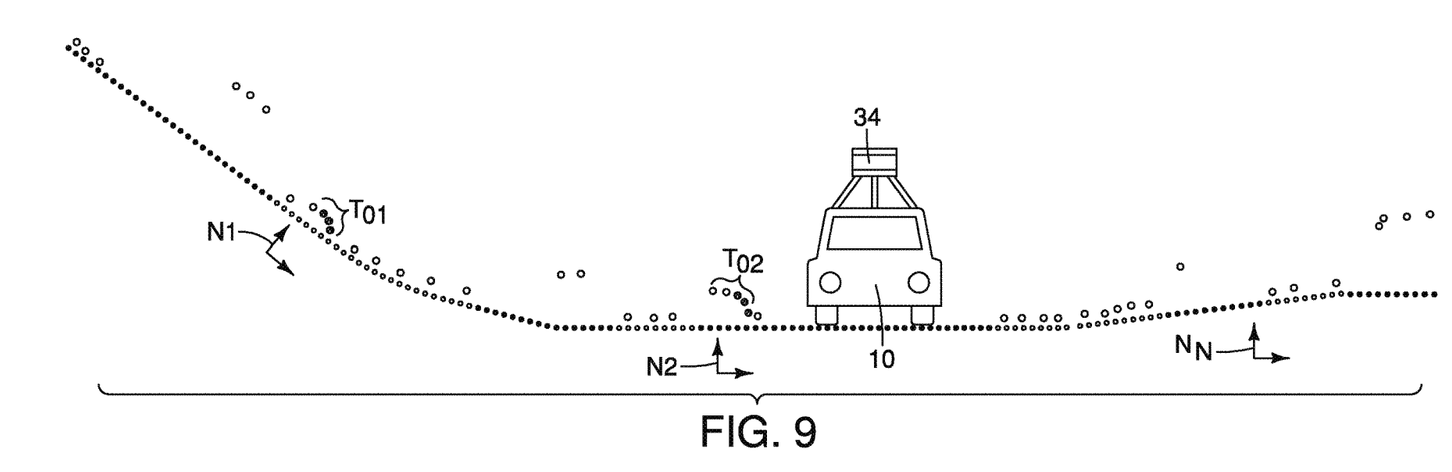
FIG. 9 is another two-dimensional schematic view of the vehicle and the 3D sensor showing elevated groups of elevated non-linear data points being identified by the electronic controller in accordance with the first embodiment.

In step S15, ground data points $G_{S1}$ located beneath the vehicle 10 and shown in FIG. 7 are assumed by the electronic controller 24 to be actual ground points, since the vehicle 10 is in contact with the ground beneath itself. Further, in step S15, using the terrain subsets $T_{S1}$ and $T_{S2}$, the electronic controller 24 extrapolates from the ground data points $G_{S1}$ to the various portions of the terrain subsets $T_{S1}$ and $T_{S2}$ and estimates the actual overall shape and contour of the terrain $T_{S3}$ on one side of the vehicle, and the terrain $T_{S4}$ on an opposite side of the vehicle 10, as shown in FIG. 8. The estimating of terrains $T_{S1}$ and $T_{S2}$ includes a geometric analysis whereby groups of data points in the estimated subsets of terrains $T_{S3}$ and $T_{S4}$ (terrain data), are evaluated by taking lines $N_1$, $N_2$ thru $N_N$ normal to smaller groups of the data points of terrains $T_{S3}$ and $T_{S4}$ thereby determining the overall slope of the actual terrain, as shown in FIG. 9. Thus, as step S15, the electronic controller 24 evaluates the group of data points (subsets $T_{S1}$ and $T_{S2}$) extracted from the point cloud $C_1$ and generates an estimate of terrain proximate the vehicle (terrains $T_{S3}$ and $T_{S4}$) including the drivable area $D_A$ (FIG. 15). The group of data points (subsets $T_{S1}$ and $T_{S2}$) are evaluated by gridding the non-vertical data points and fitting planes to groups of the lowest points in the group of data points (subsets $T_{S1}$ and $T_{S2}$).

Figure 10:
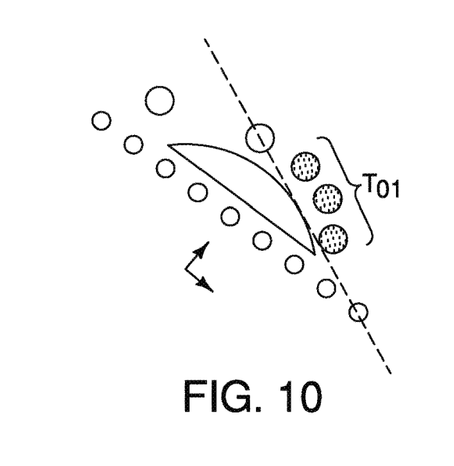
FIG. 10 is a schematic view of a first group of elevated non-linear data points being evaluated by the electronic controller using a line normal to the terrain beneath the first group of elevated non-linear data points identifying the first group as a non-drivable features such as a speed bump in accordance with the first embodiment.
Figure 11:
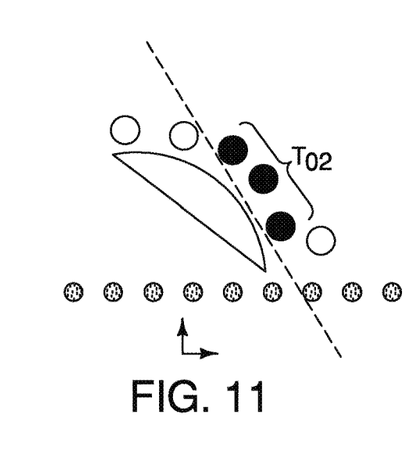
FIG. 11 is a schematic view of a second group of elevated non-linear data points being evaluated by the electronic controller using a line normal to the terrain beneath the second group of elevated non-linear data points identifying the second group as an object or obstacle defining a non-drivable area such as a curb in accordance with the first embodiment.

At step S16, the electronic controller 24 is further configured to identify curb points. One method includes evaluating the group of data points of terrains $T_{S3}$ and $T_{S4}$ representing the estimate of terrain and identify one or more vertical obstacles including one or more curbs along the drivable area $D_A$. Specifically, groups of data points such as groups $T_{O1}$ and $T_{O2}$ of the data points of terrains $T_{S1}$ and $T_{S2}$ appear to be outliers when compared to the data points of terrains $T_{S3}$ and $T_{S4}$. These groups $T_{O1}$ and $T_{O2}$ of the data points are close to the height of the estimated ground surfaces (the data points of terrains $T_{S3}$ and $T_{S4}$) but are stacked somewhat vertically with respect to the slope of the estimated ground surfaces (terrains $T_{S3}$ and $T_{S4}$) calculated in the previous step. The electronic controller identifies data points such as groups $T_{O1}$ and $T_{O2}$ as not being high enough or vertical enough to be caught in step S13 but are still hazardous for the vehicle 10 to drive into/over. These two sets of data points groups $T_{O1}$ and $T_{O2}$ corresponding to a bump-shape are not quite vertical (and thus were not removed in the step S13), but, are close to the estimated ground surface (terrains $T_{S3}$ and $T_{S4}$) and stacked somewhat vertically. Therefore, the electronic controller 24 evaluates these data points, as shown in FIGS. 10 and 11 to determine whether or not they are surfaces of a curb bordering the drivable area $D_A$.

Even though these two groups of data points (groups $T_{O1}$ and $T_{O2}$) represent reflections off of the respective objects (features $F_2$ and $F_5$ respectively in FIG. 3), the angle that the group $T_{O2}$ forms with respect to the sloped ground plane underneath it is larger than the angle that the group $T_{O1}$ forms with respect to the flat ground plane.

Thus, the group $T_{O1}$ is not considered a curb point, while the group $T_{O2}$ is considered a curb point. However, the electronic controller 24 determines that the group $T_{O1}$ can be noted as a drivable-but is possibly a speed-bump since it still forms a small angle with respect to the ground plane, the angle in FIG. 10 being less than, for example, 35 degrees.

Figure 12:
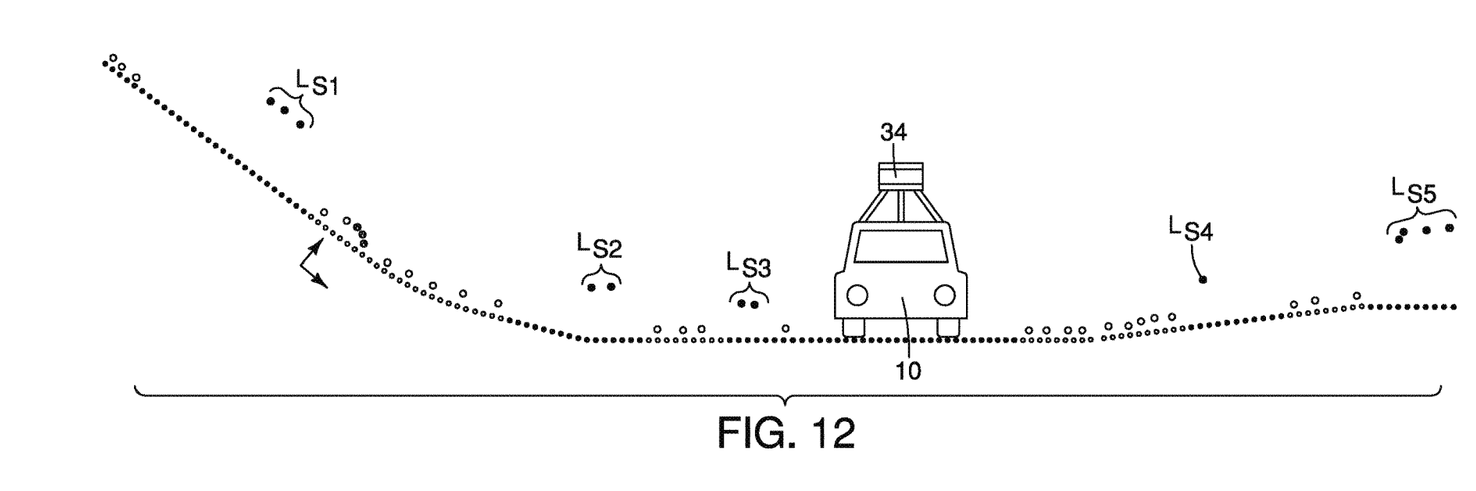
FIG. 12 is another two-dimensional schematic view of the vehicle and the 3D sensor showing elevated groups of elevated linear data points being identified by the electronic controller as upper surfaces of corresponding objects or obstacles defining corresponding non-drivable areas in accordance with the first embodiment.
Figure 13:
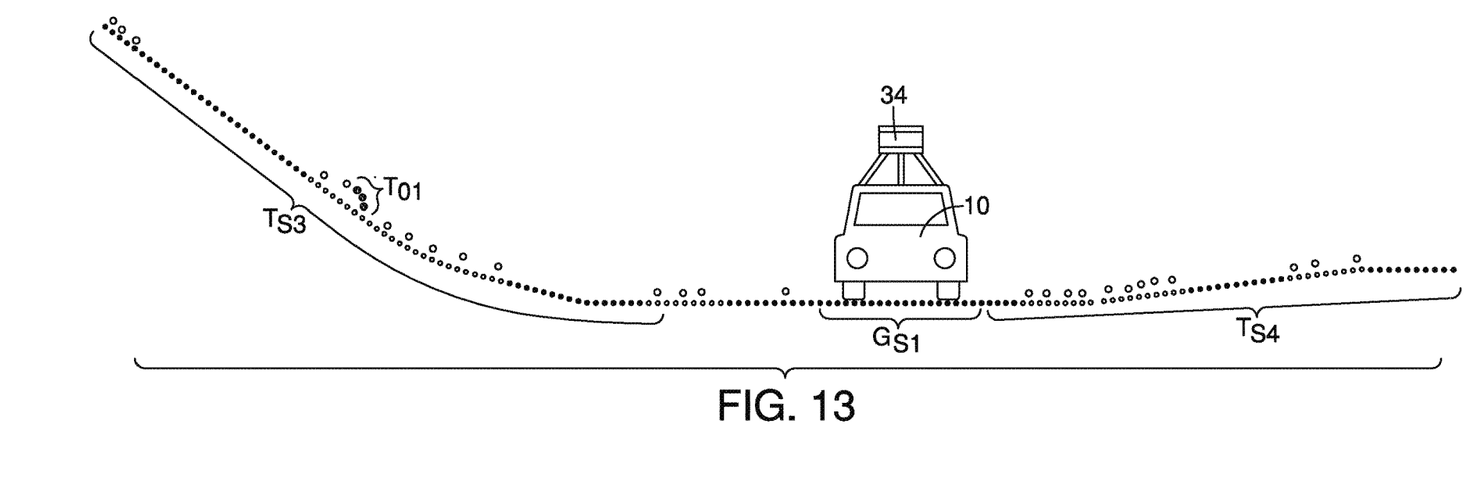
FIG. 13 is two-dimensional schematic view of the vehicle and the 3D sensor showing digital data points of the point cloud identifying terrain around the vehicle with the elevated groups of linear data points removed in accordance with the first embodiment.
Figure 14:
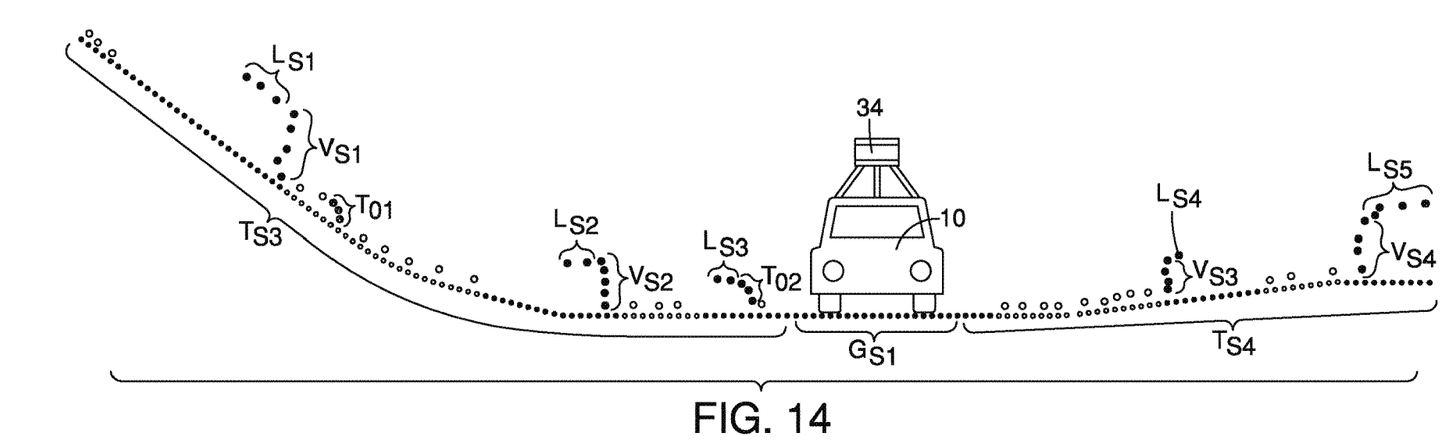
FIG. 14 is two-dimensional schematic view of the vehicle and the 3D sensor showing all groups of digital data points of the point cloud being re-assembled without discarded data points, identifying terrain, a curb and various obstacles and objects surrounding the vehicle in accordance with the first embodiment.

At step S17, the electronic controller 24 is further configured to evaluate data points by filtering out those portions of the second group of data points that are above a predetermined height relative to the vehicle and the estimate of the terrain in the absence of data points below these data points. Such data points are considered to be, for example, limbs of trees hanging down or other such structures that are too high to interfere with driving of the vehicle 10 and therefore are not obstructions or obstacles. Further, the electronic controller 24 identifies groups of linear groups of data points such as groups $L_{S1}$, $L_{S2}$, $L_{S3}$, $L_{S4}$ and $L_{S5}$, as shown in FIG. 12. These data point groups $L_{S1}$, $L_{S2}$, $L_{S3}$, $L_{S4}$ and $L_{S5}$ are at respective levels above the terrain $T_{S3}$ and $T_{S4}$ such that they are considered to be upper surfaces of obstacles and are extracted from the terrains $T_{S3}$ and $T_{S4}$. Thus, as shown in FIG. 13, the terrains $T_{S3}$ and $T_{S4}$ along with data points group $T_{O1}$ show a digital representation of the ground or terrain around the vehicle 10.

At step S17, the vertical groups of data point identified and extracted in step S13, if they extend upward relative to the estimated terrains $T_{S3}$ and $T_{S4}$ are now designated as non-drivable features. If the any of the linear groups of data points such as groups $L_{S1}$, $L_{S2}$, $L_{S3}$, $L_{S4}$ and $L_{S5}$, as shown in FIG. 12 and identified in step S17 align or are located immediately above corresponding ones of the vertical groups of data points identified and extracted in step S13, then they are designated as being part of corresponding non-drivable features.

At step S19 lane or road markings can be detected along the terrains $T_{S3}$ and $T_{S4}$ and used accordingly, if desired.

Figure 15:
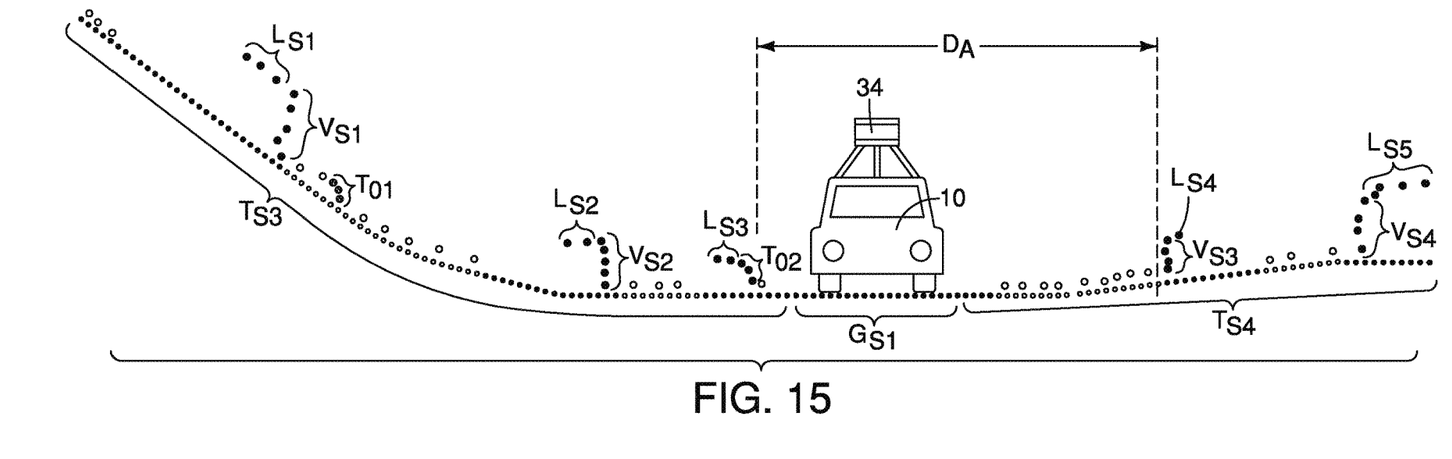
FIG. 15 is another two-dimensional schematic view of the vehicle and the 3D sensor showing a drivable area around the vehicle identified by the electronic controller in accordance with the first embodiment.

At step S20, the various groups of data points extracted in the steps above that were not discarded or ignored are combined together to form a digital rendering of the areas around the vehicle 10, as shown in FIG. 15. Specifically, the ground data points $G_{S1}$, the ground data points in groups terrain $T_{S3}$ and $T_{S4}$, vertical data groups $V_{S1}$, $V_{S2}$, $V_{S3}$ and $V_{S4}$, linear data point groups $L_{S1}$, $L_{S2}$, $L_{S3}$, $L_{S4}$ and $L_{S5}$, curb data points of group $T_{O1}$ and object data points group Too are all combined in a single digital data point set.

Figure 16:
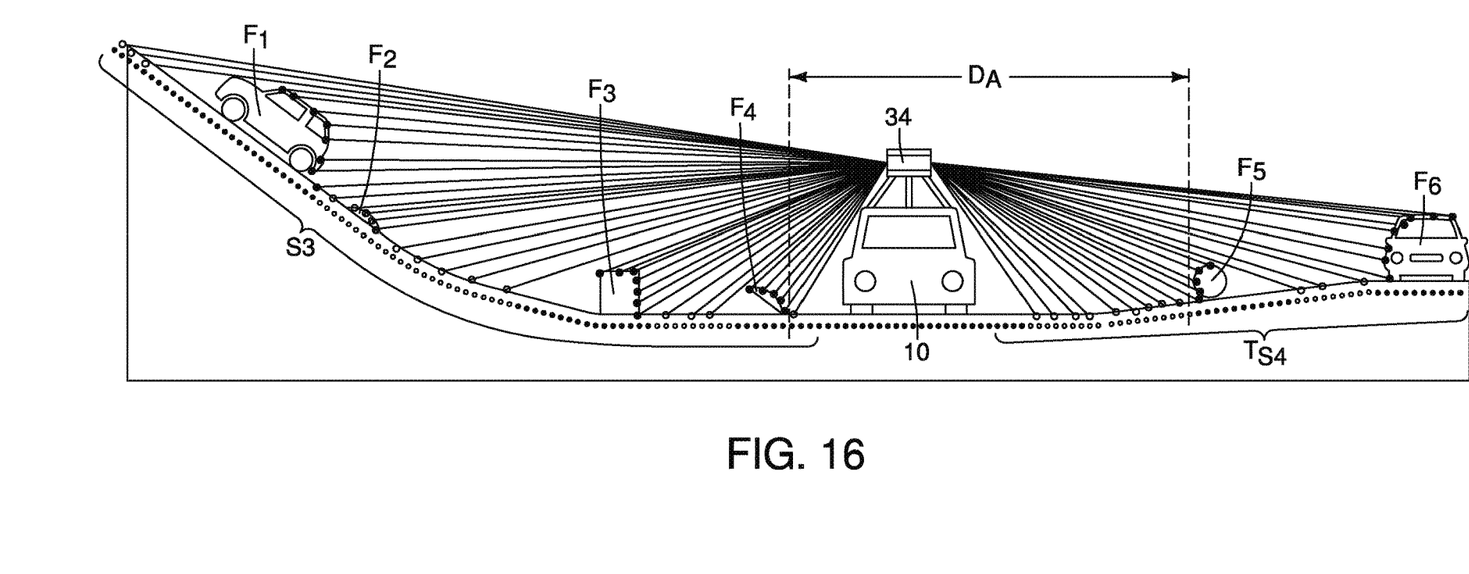
FIG. 16 is two-dimensional schematic view of the vehicle and the 3D sensor showing digital data points of the point cloud identifying terrain around the vehicle with the elevated groups of linear data points removed in accordance with the first embodiment.

Next at step S21, the electronic controller 24 evaluates drivable areas (areas without obstructions or obstacles) of the ground data points $G_{S1}$ and the terrain $T_{S3}$ and $T_{S4}$ as compared to all of the data groups shown in FIGS. 15 and 16. As a result, at step S22, the drivable area $D_A$ is identified between the obstacle $F_4$ represented by the data points of group $T_{O2}$ and the obstacle F5 represented by data points of group $V_{S3}$, as shown in FIG. 16.

At step S23, the data points of the evaluated point cloud $C_P$ are displayed on the display 32 in any of a variety of ways, as described further below.

FIGS. 17 and 18 are two examples of the evaluated point cloud $C_P$ that can be displayed on the display 32. The manual input controls 32*b* provide the vehicle operator with options for the overall appearance of the evaluated point cloud $C_P$ being displayed on the display 32. For example, if the display 32 is in the center console (not shown) as part of the IVI system, details of non-drivable areas can be provided along with the drivable area directly forward of the vehicle 10, as shown in FIG. 17. A similar appearance of evaluated point cloud $C_P$ can be provided if the display 32 is the electronic display installed to the instrument panel (not shown) on the dashboard of the vehicle 10.

Alternatively, if the display 32 is a heads-up-display that projects images onto the windscreen (not shown) of the vehicle 10 forward of the steering column 18*a* of the steering system 18, then the evaluated point cloud $C_P$ depicted in FIG. 18 can be displayed thereon. In FIG. 18, the white areas in FIG. 18 are areas non-drivable or no-go zones and can be displayed with colors or highlights to warn the vehicle operator of the limits of the drivable area.

Thus, a vehicle operator can observe drivable areas forward of the vehicle 10, observe non-drivable areas and various features near or along the drivable areas.

It should be understood from the drawings and the description herein that the images shown on the display 32, regardless of the type of display, are only dots or facsimiles thereof representing the data points of the evaluated point cloud $C_P$. Thus, regardless of lighting or weather conditions, the vehicle operator can be provided with representations of the drivable area DA relative to the vehicle along with representations of surface areas of features such as obstacles and non-drivable areas that should be avoided.

As should be understood from the above description, the displayed data points of the processed point cloud $C_P$ as depicted in FIGS. 3-18 are prepared only by conducting geometric evaluations of relationships of groups of data points in the original point cloud $C_1$. The vehicle data display system 12 evaluates the point cloud $C_1$ to achieve the processed point cloud $C_P$ without object recognition applications.

There are many advantages to the vehicle data display system 12 described above. Among them, the geometric methods described above do not require training in order to classify features as non-drivable or limited-drivable. As a result, the methods described above area able to classify non-drivable or limited-drivable features anywhere in the world. The vehicle operator's task of constantly monitoring the nearby areas for non-drivable or limited drivable features can be greatly reduced. Further, in narrow-road situations (e.g. an oncoming vehicle on a narrow mountain road), passing between a narrow space between other car or obstacle and the curb), the display 32 can provide the driver guidance and confidence that there is enough space for the car to fit/pass through, based on accurate 3D sensing of the positions of the non-drivable obstacles around the vehicle 10.

Unlike cameras which have millions of pixels sensing the environment around a vehicle, LIDAR devices (the 3D sensor 34) are typically composed of no more than 128 laser sensors scanning the environment therearound. As a result, parts of a scene often have very high density coverage and other parts, often portions of the roadway closer to the sensor/vehicle, have very light coverage if at all. As a result, part of the vehicle data display system 12 is concerned with integrating or fusing multiple high density LIDAR based point clouds in order to create a dense 3D model of the nearby roadway and road edge in the vicinity of the vehicle.

Rather, the vehicle data display system 12 relies on geometric classifiers to determine whether a feature is traversable, and if so, whether a speed limit would be required. The locations of non-traversable features are also determined by the vehicle data display system 12. Such non-traversable features include curbs, bollards, cones, toys, garage limits, trees rocks, etc. In some cases, overhead features could also be determined to be non-traversable due to their potential damage of a roof of the vehicle 10. Common traversable but speed-limited features include speed bumps, dips, and other small items on the roadway.

Alternatively, the 3D sensor 34 described above can be any of a variety of stereo cameras that can provide direction, vertical height and parallax that yields distance measurements. Stereo cameras can also be used to estimate 3D surfaces. Basically, any 3D sensor can be used as a data input to the vehicle data display system 12.

Further, in an alternative embodiment, the output (the processed point cloud) can be used to annotate the all-round-view-monitor system available in many vehicles.

The various structural vehicle features and vehicle components are conventional components that are well known in the art. Since such structural vehicle features and vehicle components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the data display system. Accordingly, these terms, as utilized to describe the present invention should be interpreted relative to a vehicle equipped with the data display system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle data display system, comprising:
    a vehicle having a vehicle body structure;
    an electronic display installed within the vehicle body structure;
    a 3-D sensor installed to the vehicle body structure, the 3-D sensor being configured to scan areas forward of and along lateral sides of the vehicle producing cloud data where each data point of the cloud data corresponds to a surface point of a physical feature and includes distance, direction and vertical location of each surface point of the physical feature relative to the vehicle; and
    an electronic controller connected to the electronic display and the 3-D sensor, the electronic controller receiving and evaluating the cloud data from the 3-D sensor generating a 3-D model of detected ones of the physical features around the vehicle including ground surfaces, non-drivable features and driving limiting features relative to the vehicle, where the non-drivable features are features that have a geometric relationships with adjacent portions of the ground surfaces and the driving limiting features are features vertically dimensioned such that caution is to be taken when driving over or on the driving limiting features,
    the electronic controller is further configured to identify groups of data points that define a physical feature within a predetermined range of heights with no detected physical features being detected between the ground surfaces a lowest data point of the detected physical feature, the detected physical feature being designated as non-drivable features and are further designated as an overhanging feature including tree branches and roof structures that do not appear to be traversable by the vehicle.

2. The vehicle data display system according to claim 1, wherein
    the electronic controller is further configured to determined which of the data points of the cloud data are ground surfaces that correspond to a roadway.

3. The vehicle data display system according to claim 1, wherein
    the electronic controller is further configured to identify groups of data points that are vertically aligned and extend above adjacent ground surfaces by less than a predetermined height are designated as driving limiting features that are traversable by the vehicle.

4. The vehicle data display system according to claim 3, wherein the electronic controller is further configured to provide a warning to a vehicle operator within the vehicle body structure to limit speed of the vehicle when the vehicle is approaching a physical feature identified as a drive limiting feature traversable by the vehicle.

5. The vehicle data display system according to claim 1, wherein
the electronic controller is further configured to identify groups of data points that are vertically aligned and extend above adjacent ground surfaces by more than a predetermined height as obstacles and are designated as non-drivable features that are not traversable by the vehicle.

6. The vehicle data display system according to claim 5, wherein
the electronic controller is further configured to provide a warning to a vehicle operator within the vehicle body structure to avoid a non-drivable feature when approaching a physical feature identified as a non-drivable feature.

7. The vehicle data display system according to claim 1, wherein
the electronic controller is further configured to identify groups of data points that define a curved physical feature below a predetermined height as one of the following: a speed hump, a speed bump or a ground surface anomaly and is designated as a drive limiting feature that is traversable by the vehicle.

8. The vehicle data display system according to claim 7, wherein
the electronic controller is further configured to provide a warning to a vehicle operator within the vehicle body structure to limit speed of the vehicle when the vehicle is approaching a physical feature identified as a drive limiting feature.

9. The vehicle data display system according to claim 1, wherein
the electronic controller is further configured to provide a warning to a vehicle operator within the vehicle body structure to avoid a non-drivable feature when approaching a physical feature identified as a non-drivable feature.

10. The vehicle data display system according to claim 1, wherein
the electronic controller is configured to operate the electronic display to show the 3-D model with detected physical features along with identification of each depicted non-drivable feature and identification of each driving limiting feature on the electronic display.

11. The vehicle data display system according to claim 1, wherein
the electronic display is a heads-up-display projected onto a predetermined area of the windshield.

12. The vehicle data display system according to claim 1, wherein
the electronic display is display that is part of an in-vehicle-infotainment system.

13. The vehicle data display system according to claim 1, wherein
the 3-D sensor is a LIDAR sensor, where the LIDAR is a light detection and ranging scanning device.

14. A method of displaying detected physical features proximate a vehicle, comprising:
providing a vehicle with a 3-D sensor;
scanning areas forward and along lateral sides of the vehicle using the 3D sensor and generating corresponding cloud data where each data point of the cloud data corresponds to a surface point of a physical feature and includes distance, direction and vertical location of each data point relative to the vehicle;
evaluating each of the data points in the cloud data thereby generating a 3D model of detected ones of the physical features around the vehicle including ground surfaces, non-drivable features and driving limiting features relative to the vehicle, where the non-drivable features are physical features that have predetermined geometric relationships relative to adjacent portions of the ground surfaces and the driving limiting features are physical features vertically dimensioned such that caution is to be taken when driving over or on the driving limiting features, the evaluating of each of the data points includes identifying groups of data points that define a physical feature within a predetermined range of heights with no detected physical features being detected between the ground surfaces a lowest data point of the detected physical feature, the detected physical feature being designated as non-drivable features and is further designated as an overhanging feature including tree branches and roof structures that do not appear to be traversable by the vehicle; and
displaying on an electronic display of the vehicle the ground surfaces, non-drivable features and driving limiting features relative to the vehicle.

15. The method of displaying detected physical features proximate a vehicle, according to claim 14, wherein
determining which of the data points of the cloud data are ground surfaces that correspond to a roadway.

16. The method of displaying detected physical features proximate a vehicle, according to claim 15, wherein
the evaluating of each of the data points includes identifying groups of data points that are vertically aligned and extend above adjacent ground surfaces by less than a predetermined height and designating those groups of data point as driving limiting features that are traversable by the vehicle.

17. The method of displaying detected physical features proximate a vehicle, according to claim 15, wherein
the evaluating of each of the data points includes identifying groups of data points that are vertically aligned and extend above adjacent ground surfaces by more than a predetermined height and designating those groups of data points as non-drivable features that are not traversable by the vehicle.

18. The method of displaying detected physical features proximate a vehicle, according to claim 14, wherein
the evaluating of each of the data points includes identifying groups of data points that define a curved physical feature below a predetermined height as one of the following: a speed hump, a speed bump or a ground surface anomaly and is designated as a drive limiting feature that is traversable by the vehicle.

* * * * *